No. 730,463. Patented June 9, 1903.

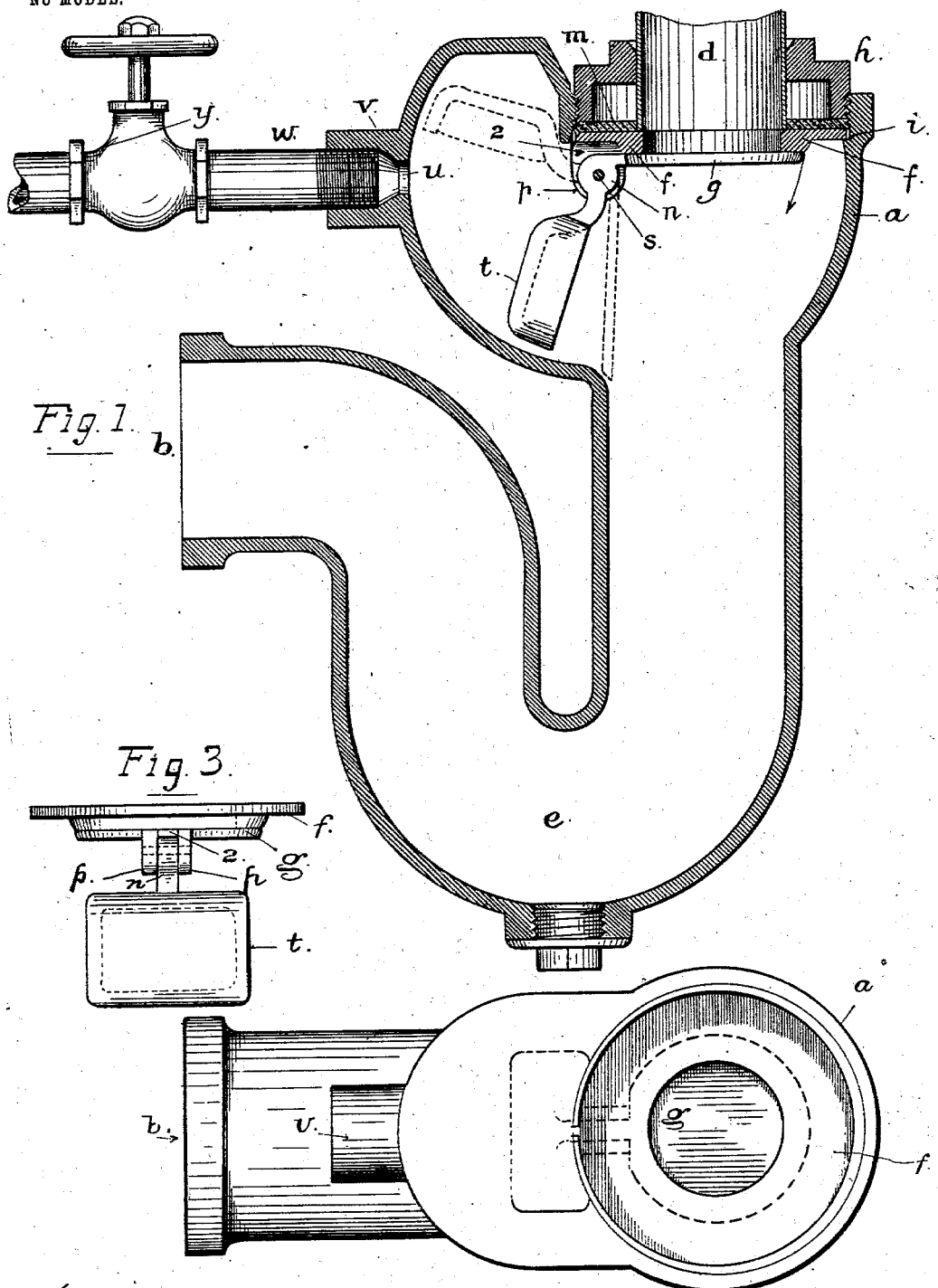

UNITED STATES PATENT OFFICE.

JOHN E. KEYT, OF SAN FRANCISCO, CALIFORNIA.

SIPHON-TRAP.

SPECIFICATION forming part of Letters Patent No. 730,463, dated June 9, 1903.

Application filed July 21, 1902. Serial No. 116,349. (No model.)

*To all whom it may concern:*

Be it known that I, JOHN E. KEYT, a citizen of the United States of America, and a resident of the city and county of San Francisco, and State of California, have invented certain new and useful Improvements in Siphon-Traps, of which the following is a specification.

This invention relates to improvements made in that class or description of siphon-trap which is provided with a valve in addition to the water trap or seal to prevent the escape of foul gases from the waste-pipe or sewer into the receptacle protected by the trap whenever the water seal is broken or fails to work properly.

The improvements comprise a novel construction and combination of trap-body having an inlet-aperture in the top, a self-closing valve controlling such inlet arranged to open under the weight of the waste water flowing into the trap and at all other times to seat tightly over the inlet by gravity, and means permanently connected with or fixed in the trap-body for applying a jet of clear water against the surfaces of the parts.

The invention includes as well a trap-body of novel construction having the inlet-aperture for the waste water in the top of the body, a removable valve-seat in said aperture, and a downwardly-acting valve seated against the under side of the opening and normally held to its seat by a counterweight, and a nozzle in the side of the trap-body arranged to deliver a jet of water from a supply outside against the surfaces of the valve and its seat, the nozzle being connected with a clean-water pipe by a pipe in which is a hand-operated valve for turning on and shutting off the water.

The invention is applicable to all siphon-traps having an upright leg on the inlet side of the water-seat through which the waste water flows directly downward or in which the discharge-pipe leading from the outlet-aperture of the receptacle above the trap has its outlet end situated in substantially a horizontal plane.

The following description explains in detail the manner in which I proceed to apply and carry out these improvements and the production of a siphon-trap in accordance therewith, the accompanying drawings being referred to therein by characters.

Figure 1 is a longitudinal sectional view of a siphon-trap embodying this invention, showing a portion of the discharge-pipe leading downward from the basin or receptacle to which the trap may be applied. Fig. 2 is a plan or top view of the trap with the discharge-pipe and the screw-cap removed from the inlet-opening in the top of the valve-body. Fig. 3 is an elevation of the valve and the valve-seat removed from the valve-body.

The trap-body in this improvement has the waste-water pipe situated in the top $a$ and the outlet at the side $b$, with the trap or water seal $e$ located between them in such position that a portion of the body of waste water passing through the trap is retained in the trap.

A tube $d$, fixed in the opening in the top of the trap-body, is connected at the upper end to the outlet of the receptacle above, and its lower end rests directly upon a flat ring $f$, that forms a seat around the inlet-aperture for an upwardly-acting valve $g$. The opening in the top of the valve-body is closed by a screw-cap $h$, having a rim, with an external screw-thread, fitted to an internal thread in the body, and the bottom of the rim bearing on the ring when the cap is screwed down to place brings that part to a tight seat on a shoulder $i$ at the bottom of the threaded opening.

The internal diameter of the tube $d$ should correspond with the diameter of the opening in the ring $f$, and the end of the tube should be cut squarely across to fit closely on the top face of the ring, and thus make a tight joint at the junction of the tube and the ring.

A gas-tight joint, secured by inserting a packing-ring $m$, of rubber or other material having the required qualities to secure the desired end, is inserted between the screw-cap and the top face of the ring $f$ before the former is screwed down to place. The opening in this packing-ring should be the same size as the end of the tube on which it is fitted, so that under the compression of the screw-cap the packing-ring will press firmly against the outside of the tube at the same time that the cap presses the packing tightly against the top face of the ring. By this means a gas-tight joint and coupling is produced between the trap-body and the tube connecting it with the basin or other receptacle, and the trap is capable of being uncoupled and taken off simply by unscrewing the cap $h$.

The ring $f$, forming the valve-seat, is separable from the trap-body and can be taken out by unscrewing the cap and withdrawing the connecting-tube.

The valve $g$ is directly and permanently attached to the ring $f$ by a hinge-joint, so as to open downwardly and when brought to a horizontal position to seat closely against the under side of the ring. This valve consists of a flat disk, with a knuckle $n$ on one side that forms the movable member of a hinge-joint, the remaining parts of which are two lugs $p\,p$, depending from the under side of the ring, and a pin $s$, inserted through holes in the lugs and an eye in the knuckle. A weighted arm $t$, extending from the same side of the valve-disk, but beyond the pivot of the hinge, acts to hold the disk up to its seat and to bring it back to place whenever the weight or pressure of the water upon the top of the valve becomes less than the force of gravity acting in the opposite direction through the weighted arm. Opening downwardly in this manner the valve swings to one side under the weight of the descending body of water, affording a clear way and passage downward into the trap, and immediately returns to its seat and is retained in position across the inlet after the body of water has passed the valve.

The valve-body is enlarged at the upper part, where the valve is situated, as shown in Fig. 1, in order to give proper room for the valve and its weighted arm to swing freely and clear of the surrounding walls. The opening in the top of this chamber, which is closed by the screw-cap $h$, is of sufficient size to allow the valve-seat and the valve to readily be lifted out and replaced. An aperture $u$ in the side of this chamber nearest to the hinge of the valve $f$ is surrounded by a rim or boss $v$, screw-threaded for coupling to the aperture a clean-water pipe $w$, in which is a hand-operated valve $y$ for turning on and shutting off the water. This pipe $w$ is permanently connected with either the hot-water or the cold-water service-pipe, so as to be always ready for use and to furnish ready at hand a means of cleaning out the interior of the trap without opening the trap or disturbing the connections. The aperture $u$ is reduced in area and has converging walls, as shown in Fig. 1, for the purpose of increasing the force of the jet. The aperture is also located directly behind and in line with the hinge of the valve and in such position also that the jet is directed between and over the faces of the valve and the valve-seat, thereby furnishing a means of washing off the surfaces and removing particles of dirt or matter that are liable to lodge in the hinge-joint or on the valve or its seat. A clear space 2 over the knuckle of the hinge allows the jet to enter at that point and pass over the top of the valve when it is seated. This jet also forms means for flushing out the trap at frequent intervals, in which operation the valve is held to its seat by the pressure of the water entering and filling the upper part of the trap from the supply-pipe $w$, and the full force of the water entering faster than it passes out acts to carry out of the bend of the trap and the outlet on the opposite side any solid matter or accumulations in the trap and to thoroughly wash out the passages.

The clean-water flushing and cleaning jet is of great importance in connection with the valve controlling the waste-water inlet, as it renders the use of the latter practicable by insuring clean surfaces both to the valve and its seat, without which its value as a means of shutting off communication between the upper part of the trap and the basin or receptacle protected by the trap would be very small.

Having thus fully described my invention, what I claim as new therein, and desire to secure by Letters Patent, is—

1. In a siphon-trap, the combination with a trap-body having a water seal and an upper open-ended limb extending upward therefrom, of a removable valve-seat arranged in the upper limb of the trap, a screw-cap for closing the upper open end of the trap and for holding the valve-seat in place, a tube $d$ passing through the said screw-cap, and a weighted valve arranged to close against the said valve-seat, substantially as set forth.

2. In a siphon-trap, the combination of a trap-body having a water seal and an upper open-ended limb extending upward therefrom, a removable valve-seat in the upper limb of the trap, a removable cap for closing the upper end of the limb of the trap and for holding the valve-seat in place, a tube $d$ passing through the said cap, and a valve arranged to close against the valve-seat and connected therewith by a hinged joint whereby when the cap is removed the valve-seat and the valve may be removed together, substantially as set forth.

3. The combination with a siphon-trap having a body formed with a water seal and an upward-extending, open-ended limb, a removable valve-seat arranged in the open end of the said limb of the trap-body, a screw-cap arranged to close the upper, open end of the trap, a tube $d$ extending through the said screw-cap and terminating adjacent to the valve-seat, a packing-ring arranged about the tube $d$ and between the screw-cap and the valve-seat, and a weighted valve arranged to normally bear against the valve-seat and to close the end of the tube $d$, substantially as set forth.

4. In a siphon-trap the combination, with a trap-body having a water seal, an upright limb extending upwardly therefrom, a seat in the open end of said limb, a flat-faced ring removably seated thereon the lower face of said ring forming a valve-seat, a hinged upwardly-acting valve, a weight acting to hold the valve normally to the valve-seat, said valve being adapted to yield and open under the weight of the water flowing into the trap, a tube detachably connected to the upright limb and having its lower end seated on the upper face of the valve-ring, and a coupling securing said tube in place.

5. The combination with a siphon-trap, of a valve arranged to normally close the inlet of such trap, there being a clear space 2 over the knuckle of the hinge, and a water-supply pipe arranged opposite the hinge, whereby the hinge may be cleansed, and when the valve is opened the water will pass through the space 2 to clean the upper surface of the valve, substantially as set forth.

6. In a siphon-trap the combination with a trap-body having a water seal, and an upright limb extending upward from the water seal, of a valve-seat in the said upright limb, a swinging valve arranged to close against the said valve-seat, and adapted to yield and open downwardly under the weight of the water, a counterweight operating to return said valve to its seat, and means permanently connected to the upright limb of the trap-body for applying a jet of water to the interior space above the water seal in line with the closed valve.

7. A siphon-trap having a water seal; a standing limb extending upwardly therefrom, a valve-seat in the open upper end of the standing limb and a lateral enlargement of the standing limb below the line of the valve-seat; in combination with a downwardly-swinging hinged valve adapted to open under the weight of the descending water, a counterweight holding said valve normally to its seat, an inlet in the side of the upright limb in line with the hinge of the valve, and a water-supply pipe connected to the said inlet, and having a shut-off valve.

In testimony whereof I have signed my name in the presence of two subscribing witnesses.

JOHN E. KEYT.

Witnesses:
GEO. T. KNOX,
EDWARD E. OSBORN.